Figure 1:
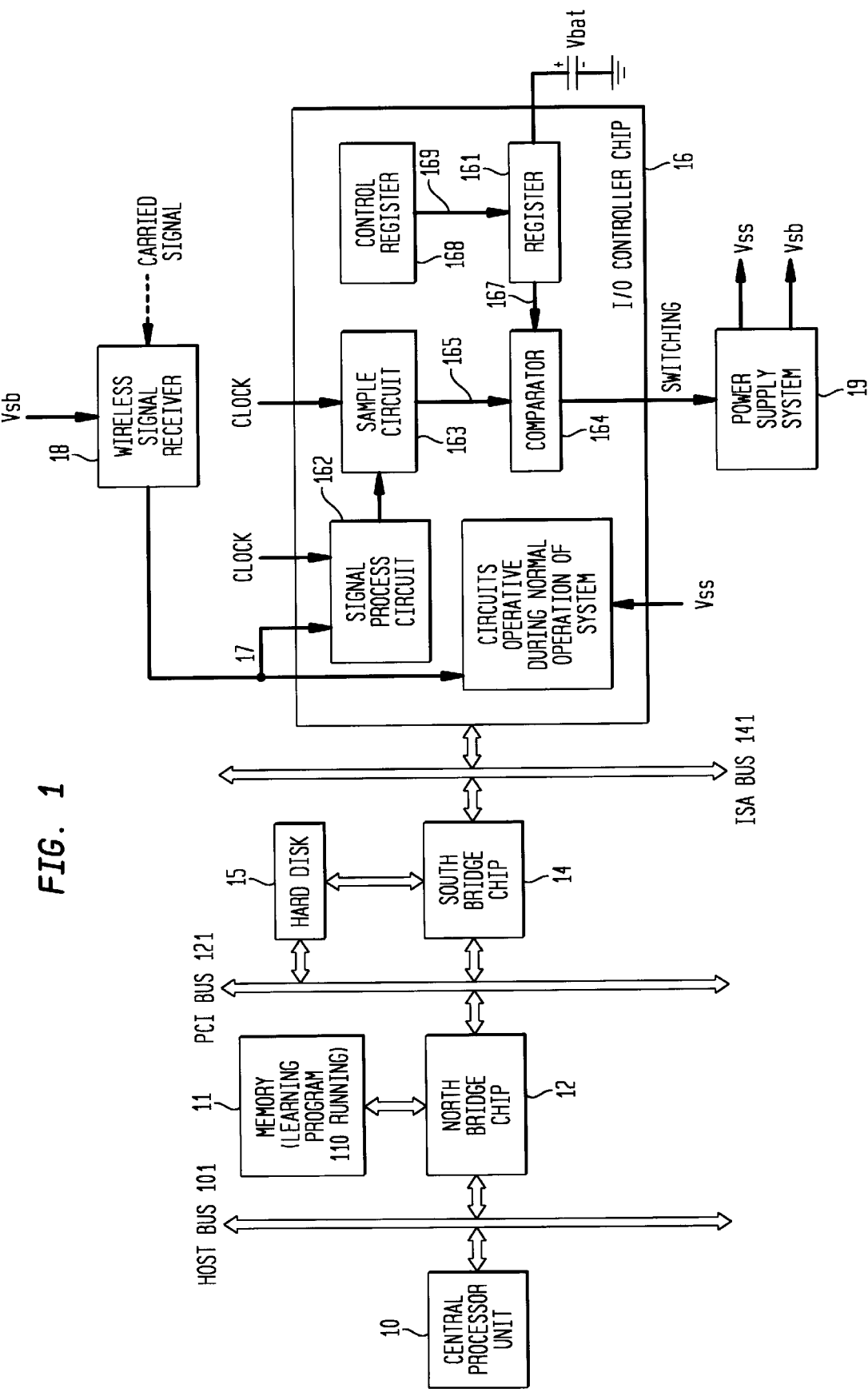

United States Patent
Huang

[19]

[11] Patent Number: 5,856,789

[45] Date of Patent: Jan. 5, 1999

[54] POWER SUPPLY SWITCHING OF A COMPUTER SYSTEM BY A REMOTE CONTROLLER

[76] Inventor: Der-Shyun Huang, c/o Winbond Electronics Corp., No. 4, Creation Rd., 3rd., Science Based Industrial Park, Hsinchu, Taiwan

[21] Appl. No.: 935,853

[22] Filed: Sep. 23, 1997

[51] Int. Cl.$^6$ ..................................................... H04B 1/00

[52] U.S. Cl. ................... 340/825.72; 340/825.69; 340/825.31; 340/825.34; 395/750.01; 395/750.02; 364/178

[58] Field of Search ................. 340/825.72, 825.69, 340/825.314; 395/750.01, 750.02, 750.03, 750.07, 750.08; 364/178

[56] References Cited

U.S. PATENT DOCUMENTS 5,051,720  9/1991  Kittirutsunetorn ....................... 340/827

5,191,323  3/1993  Abbes et al. ......................... 340/825.37

Primary Examiner—Michael Horabik
Assistant Examiner—Y. Beaulieu
Attorney, Agent, or Firm—Proskauer Rose LLP

[57] ABSTRACT

A method and apparatus for switching the power supply of a computer system by a remote controller are provided. A configuration step is performed first which assigns a selected button on a remote controller to a wake-up operation of the computer system. At the end of the configuration step, a code representative of the selected button being activated is stored into a register within the computer system. If the selected button is found to be activated, the method and apparatus instruct the power supply system to turn on the main power supply.

8 Claims, 4 Drawing Sheets

5,856,789

POWER SUPPLY SWITCHING OF A COMPUTER SYSTEM BY A REMOTE CONTROLLER

FIELD OF INVENTION

The present invention relates to a method and apparatus for controlling the power switching of a computer system by a remote controller.

BACKGROUND OF INVENTION

The remote controllers have been widely used for controlling the operation of many appliances, e.g. TV, audio player system, video player system. However, one remote controller specific to one appliance, in general, can not be used with other appliances. For instance, remote controller coming with TV can not control the operation of other appliances, i.e. household air conditioner system. Furthermore, the control function of each button on one specific remote controller is predefined by controller in the appliance. Although some remote controllers have learning capability, the emulated function after learning (configuration) procedure is not effective to other appliances. Main reason of this limitation is caused by a preset transmit frequency at the remote controller side and preset receiving frequency at the receiver side of the appliance. Typically, the data transmit frequency of the remote controller falls between 20 Khz~60 Khz among different appliances and different brands. The output data code for same function button among different remote controllers also differs.

Traditionally, the personal computer system has many different kinds of peripheral devices which communicate with the computer systems via different kinds of cable. However, peripheral device with wireless communication has been rare. Due to limitation of the cable, the user's location has to be close to the input device of computer system in order to use or control the computer system.

The state-of-art computer system usually provides energy-saving features which selectively switches off the main power to certain components when the system is idle for extended periods of time. The conventional power management circuit monitors a keyboard, mouse or other system elements for signs of activity and turns off a main supply power Vss if no activity is found for a predetermined period of time. This places the system in a standby mode of operation. In standby mode of operation, a low current standby power supply Vsb is provided to supply power to standby logic circuit. The standby logic circuit functions to force the system to exit the standby mode in response to a wake-up activity. In addition, the computer system typically includes a low-current lithium battery power supply for providing power to system timekeeping circuitry, which includes a well known real time clock (RTC), while the system is completely shut down.

In some environments, the user may wish to access other devices connected to the computer system without accessing the traditional keyboard or computer mouse. For instance, when a user wants to access his information in the storage device within the computer system for immediate presentation in a seminar, a remote controller will best serve the purpose. At present time, the infrared remote controllers coming with home appliances are straight forward choice if they may serve the purpose. However, it appears that, without additional technology, the traditional home appliance remote controller will not serve the purpose of controlling the computer system due to aforementioned reasons. When the computer system is in standby mode, the user may wish to wake up the computer system by a conventional remote controller.

Therefore, it is the object of the instant invention to control the power supply switching of a computer system by a button of a conventional remote controller.

SUMMARY OF THE INVENTION

Performing the learning process of the invention to the computer system via any kinds or brands of remote controller, one selected button on the remote controller may be assigned to power switching operation of the computer system. In this way, the conventional remote controller, together with the infrared signal receiver on the computer system, are used to control the power switching of a computer system. The conventional remote controller becomes a wireless computer peripheral device.

The invention uses a personal computer as a platform. Via an over-sampling scheme, any kinds or brands of remote controller can be trained as a wireless peripheral device. The user does not have not care about the data transmit frequency of the remote controller implements. The selected button on the remote controller needs to go through a learning process provided by the invention. After over-sampling procedure for each activated button, corresponding sampled code and the link to corresponding operation are stored in the computer system. Among them, the sampled code for button assigned for power supply switching control is converted back to its original value and saved in one register powered by battery power supply. During standby mode of the computer system, the wireless signal receiver, the sample circuit, the control register and a comparison circuit is powered by a standby power supply. When the button assigned for power supply switching control is activated during standby mode, a sample code is obtained by a sample circuit operated by clock from Real Time Clock (RTC). When a match condition is obtained by the comparison circuit comparing the sample code with value of the register, an activated switching signal output by the comparison circuit switches the power supply system to the main power supply.

BRIEF DESCRIPTIONS OF THE APPENDED DRAWINGS

FIG. 1 discloses a hardware function block in which the learning process of the invention is performed.

Figure 2A:
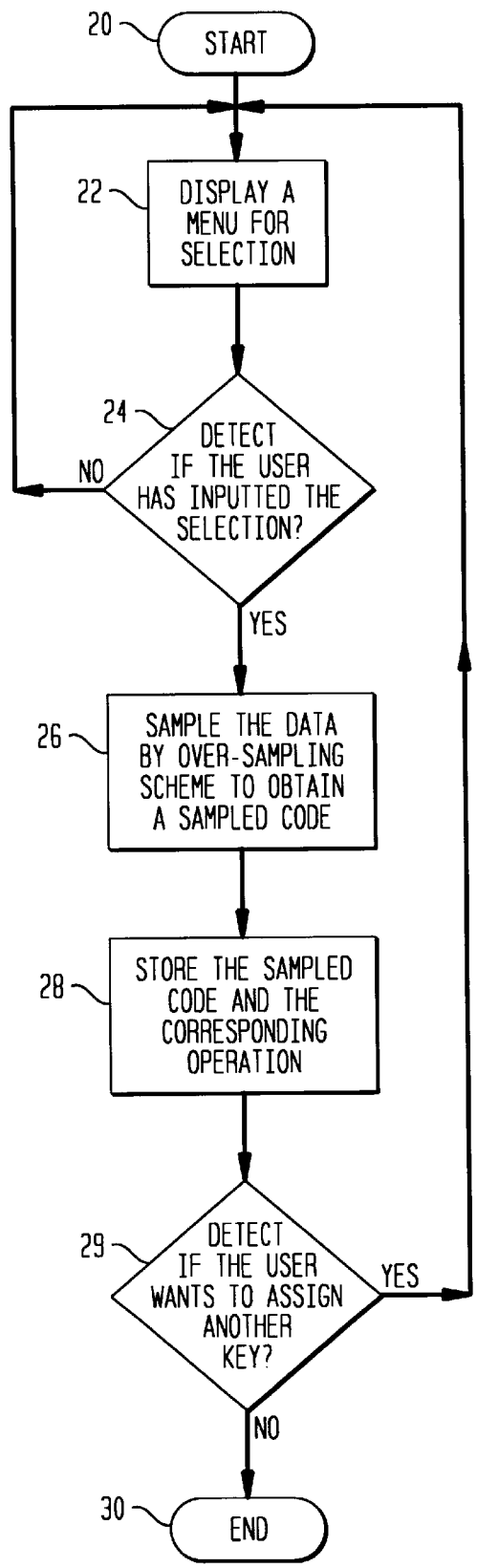

FIG. 2(a) discloses the steps of learning process of the invention.

Figure 2B:
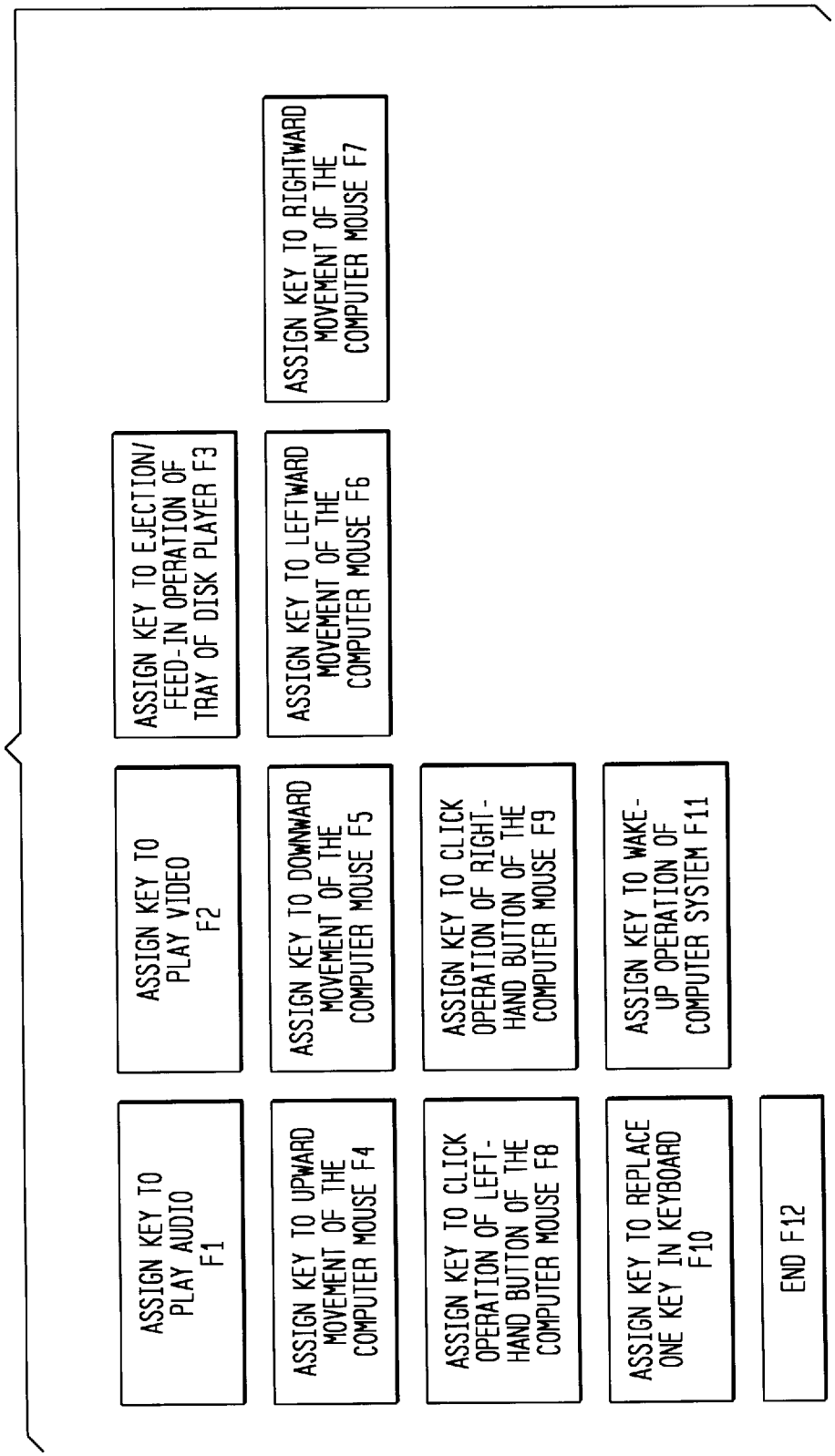

FIG. 2(b) disclose one embodiment of the menu generated by learning process of the invention which needs the user to input his selection.

Figure 3A:

FIG. 3(a) discloses the timing example of signal generated when one selected button of remote controller is activated.

Figure 3B:

FIG. 3(b) shows a signal in FIG. 3(a) carried by a carrier.

Figure 3C:
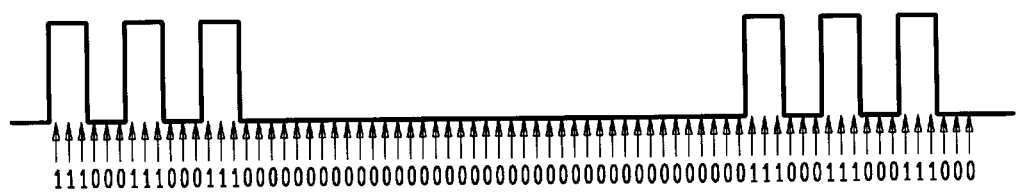

FIG. 3(c) discloses the over-sampling operation of the invention performed on the signal of FIG. 3(b).

DETAILED DESCRIPTIONS OF THE PREFERRED EMBODIMENT

As shown in FIG. 1, a state-of-art computer system includes a center processor unit 10, a north bridge chip 12, a south bridge chip 14, an I/O controller chip 16, a wireless signal receiver 18, a memory 11 and a storage device 15, i.e. a HDD. The preferred embodiment of the wireless signal receiver 18 is an infrared signal receiver. As conventional approach, the memory 11 is coupled to the north bridge chip 12. The north bridge chip 12 is operative to interface the host bus 101 and PCI bus 121. The south bridge chip 14 is operative to interface the ISA bus 141 and the PCI bus 121. The I/O controller chip 16, via ISA bus 141, connects to the south bridge chip 14. The wireless signal receiver 18 outputs electric signal via line 17 to I/O controller chip 16. The data sample rate to the signal on line 17 is internally controlled by the I/O controller chip 16. Before executing the learning program 110 of the invention, the learning program 110 must be loaded first from the storage device 15 into memory 11 by the conventional approach. In an alternative computer system, the I/O controller chip 16 may be coupled to the PCI bus 121. Furthermore, the I/O controller chip 16 includes a register 161, a signal process circuit 162, a sample circuit 163, a control register 168 and a comparator 164 associated with the present invention and only operative during standby mode of the computer system.

During standby mode, the wireless signal receiver 18, the signal process circuit 162, the sample circuit 163, the control register 168 and comparator 164 are powered by the standby power supply Vsb. In all modes, the register 161 is powered by battery power supply Vbat such that value within will be available all the time. The signal process circuit 162 uses a clock output from RTC, i.e. a 32 KHz clock signal, to process the input modulated signal 17 when needed. The sample circuit 163 also uses the clock output from RTC, i.e. a 32 KHz clock, to sample the input signal from signal process circuit 162.

Firstly of all, during normal operation mode, the invention involves a configuration procedure which assigns each select button of the conventional remote controller to a predetermined operation of the computer system, as shown and described in FIG. 2(a). After the start point 20 of this configuration process, in block 22, the process displays a menu which needs user's selection of the operation he/she intends to emulate. The user inputs his selection at this stage by the keyboard or computer mouse. The operations of the computer system may include audio play, MPEG play, tray in/out of disk player, mouse move, power supply switching from Vsb to Vss, or execution of a software program. One example of the menu is shown in FIG. 2(b) and readily understood by persons skilled in the arts. In block 24, the process detects if the user makes his/her selection on the items of menu generated on the display device. If it is yes in block 24, in block 26, the process samples the data coming in when the selected button is activated by the user by an over-sampling scheme to obtain a corresponding sample code. The over-sampling scheme applied will be more clearly in recitations with regard to FIG. 3(c). Depending on operation selected in FIG. 2(b), in block 28, the process records the obtained sampled code, the link relationship of the sampled code to the pre-determined operation into a computer system. In block 29, the process detects if the user wants to configure another select button and corresponding operation of the computer system. After all selected buttons on a conventional remote controller have been assigned to their respective operations, a plurality of sampled codes and predetermined operations corresponding to each sampled code are stored in the computer system. In a preferred embodiment, the sampled code obtained in the above processes for button assigned to the power switching is first converted back to its original data value in order to reduce the data bits and then stored in the register 161. For other selected operations in FIG. 2(b), the sampled code obtained and the link relationship of the sampled code to the predetermined operation are stored in a device driver. Since the invention relates on the switching of power supply to the computer system from Vsb to Vss, the following recitations focus on this respect.

The followings describe how the over-sampling scheme, operated on the output code on line 17 corresponding to an activation status of a selected button, obtains a sampled code. As shown in FIG. 3(a), assume one selected button, when activated, on remote controller generate signal 1001 at f1 frequency. The remote controller adds a carrier signal of frequency f2 to the original signal of FIG. 3(a) when transmitting the data out wirelessly.

The resulting output signal is that shown in FIG. 3(b).

In a preferred embodiment, f2=(5 times of f1)~(20 times of f1). The main difference among different remote controllers resides in distinct period of the carrier signal employed when transmitting signal out. Since prediction of the transmit frequency of the remote controller held by one user is impossible, the invention uses a much higher frequency f3 to sample the data on line 17, at each ↑ locations shown in FIG. 3(c). The over-sampling operation obtains a long string of following data 1110001110001110000 . . . . 00111000111000111000. This long string of data is the sampled code corresponding to the activation of the selected button. Each time one specific button is activated and the output data is oversampled at the same frequency f3, the sampled code will be unique to this button. In a preferred embodiment, f3=(10 times of f2)~(20 times of f2). Through the learning process of FIG. 2(a), the plurality of sampled codes, except the sampled code corresponding to the button for power switching, and each corresponding operations assigned to will be recorded in the device driver, which is be used to drive the remote controller. As recited above, in order to reduce the size of the register 161 required, the sampled code obtained in the above process for button assigned to the power switching is first converted back to its original value and stored in the register 161 which is powered by the battery power supply Vbat. That is, assume 1110001110001110000 . . . . 00111000111000111000 is obtained when assigning the power switching button, then value of 1001 is recovered and stored in the register 161. Nevertheless, this invention uses the long string of data obtained by the over-sampling scheme to recognize which button on the remote controller is activated during normal operation mode of the computer system.

Assume the computer systems enters into the standby mode due to the event of the system being idle for a predetermined period of time. During the standby mode, main power supply Vss is shut down and only standby logic circuit is powered by the standby power supply Vsb. As the user activates the emulated power switching button on the remote controller, the corresponding signal on line 17 is processed by the signal process circuit 162 to remove the carrier signal, if any, via 32 KHz clock signal from RTC. The output signal from the signal process circuit 162 then is sampled by the sample circuit 163 operated by 32 KHz clock signal from RTC. The read control signal 169 controls the timing of the outputs of data within the register 161. During the learning procedure for power switching button, based on the frequency relationship between the f1 and the 32 KHz clock signal from RTC, the control register 168 is written into a control value. This control value determines the timing of the output of the respective values within the register 161 on line 167. The comparator 164 compares the codes on lines 165 and 167 respectively and finds a match condition. The asserted switching signal outputted from the comparator 164 then turns off the standby power supply Vsb and turns on the main power supply Vss. This effects the object and function of the invention. Afterwards, the computer system enters into normal mode in which all elements are powered by the main power supply Vss.

Though the above descriptions use the infrared signal as an example of wireless signal transmission, the spirit of the invention also applied to any kinds of wireless transmission. Furthermore, the invention also applies to an environment in which the data is transmitted by the remote controller without a carrier signal. In this situation, the inputted wireless signal on line 17 takes form of that shown in FIG. 3(a). When this happens, the signal process circuit 162 does nothing on the input signal 17. The invention together with those described alternative embodiments are also the intended scope of claims defined by the appended claims.

What is claimed is:

1. A method for waking up a computer system by a button of a remote controller, the computer system including a wireless signal receiver and a power supply system selectively generating a main power supply and a standby power supply, the button, when activated, generating a data code at f1 frequency, the remote controller transmitting the data code out wirelessly via a carrier signal of f2 frequency, f2 being larger than f1, the method comprising the steps of:
   (1) assigning the button to be a wake-up operation of the computer systems, said step of assigning comes the steps of:
      (11) specifying the wake-up operation,
      (12) instructing the computer system to sample data at f3 frequency wherein f3 is larger than f2,
      (13) the computer system obtaining a code corresponding to the button while the button is activated, and
      (14) storing the code into a register in the computer system, wherein the register is powered by a battery power supply when the power supply system is totally shut down;
   (2) determining if the button is activated: and
   (3) if the button is activated in step (2), instructing the power supply system to turn on the main power supply to power the computer system.

2. The method in claim 1, wherein the step (2) comprising:
   (21) sampling the data code at f3 frequency such that a sampled code is obtained;
   (22) comparing the sampled code with value of the register.

3. A computer system including a wireless remote receiver adapted to communicate with a remote controller, the computer including a power supply system selectively generating a main power supply and a standby power supply, each button of the remote controller, when activated, generating a data code at f1 frequency, the remote controller transmitting the data code out wirelessly via a carrier signal of f2 frequency, f2 being larger than f1, the computer system comprising:
   a central processor unit;
   a memory coupled to the central processor unit, the memory storing a procedure when assigns one selected button on the remote controller to be a wake-up operation of the computer system by sampling data at f3 frequency such that a code corresponding to the selected button is obtained while the selected button is activated, wherein f3 is larger than f2, and storing the code into a register within the controller; and
   a controller, responsive to activation of the selected button, for instructing the power supply system to turn on the main power supply to power the computer system.

4. The computer system of claim 3, wherein the controller comprises:
   a signal process circuit which selectively processes the data code for generating a demodulated signal;
   a sample circuit for sampling the demodulated signal and outputting a sample code; and
   a comparator, having input receiving value of the register, for selectively generating a switching signal by comparing the sample code with value of the register.

5. A method for waking up a computer system by a button of a remote controller, the computer system including a wireless signal receiver and a power supply system selectively generating a main power supply and a standby power supply, the remote controller generating a data code corresponding to the activated button at f1 frequency wirelessly, the method comprising the steps of:
   (1) assigning the button to be a wake-up operation of the computer system, said step of assigning comprises the steps of:
      (11) specifying the wake-up operation,
      (12) instructing the computer system to sample data at f2 frequency, wherein f2 is larger than f1,
      (13) the computer system obtaining a code corresponding to the button while the button is activated, and
      (14) storing the code into a register within the computer system;
   (2) determining if the button is activated; and
   (3) if the button is activated in step (2), instructing the power supply system to turn on the main power supply to power the computer system.

6. The method in claim 5, wherein the step (2) comprising:
   (21) sampling the data code at f2 frequency such that a sampled code is obtained;
   (22) comparing the sampled code with value of the register.

7. A computer system including a wireless remote receiver adapted to communicate with a remote controller, the computer system including a power supply system selectively generating a main power supply and a standby power supply, the remote controller generating a data code at f1 frequency wirelessly when one button of the remote controller is activated, the computer system comprising:
   a central processor unit;
   a memory coupled to the central processor unit, the memory storing a procedure when assigns one selected button on the remote controller to be a wake-up operation of the computer system by sampling data at f2 frequency such that a code corresponding to the selected button is obtained while the selected button is activated, wherein f2 is larger than f1, and storing the code into a register within the computer system; and
   a controller, responsive to activation of the selected button, for instructing the power supply system to turn on the main power supply to power the computer system.

8. The computer system of claim 7, wherein the controller comprises:
   a sample circuit for sampling the data code and outputting a sample code; and
   a comparator, having input receiving value of the register, for selectively generating a switching signal by comparing the sample code with value of the register.

\* \* \* \* \*